United States Patent [19]
Stelter et al.

[11] Patent Number: 5,736,676
[45] Date of Patent: Apr. 7, 1998

[54] FLOOR STRUCTURE ELECTRICAL JUNCTION APPARATUS

[76] Inventors: Michael S. Stelter, 335 Meadowlake Blvd., Aurora, Ill. 60504; Joseph C. Marino, 1410 Russell Ct., Arlington Heights, Ill. 60005

[21] Appl. No.: 502,000

[22] Filed: Jul. 13, 1995

[51] Int. Cl.⁶ ......................................... H01H 9/02
[52] U.S. Cl. ......................................... 174/53; 174/58
[58] Field of Search .............................. 174/53, 66, 67, 174/50.52, 50.51, 50, 52.1, 52.2, 52.4, 52.6, 58, 59, 65 R, 48, 49; 52/220.5, 220.7, 220.1

[56] References Cited

U.S. PATENT DOCUMENTS

| | | | |
|---|---|---|---|
| 4,041,298 | 8/1977 | Penczak | 174/48 |
| 4,273,404 | 6/1981 | Hedlund et al. | 339/93 R |
| 4,827,080 | 5/1989 | Castellani et al. | 174/48 |
| 5,350,884 | 9/1994 | Littrell | 174/48 |

*Primary Examiner*—Kristine L. Kincaid
*Assistant Examiner*—Dhiru R. Patel
*Attorney, Agent, or Firm*—Brezina & Ehrlich

[57] ABSTRACT

A floor structure electrical junction apparatus mounted within a structural slab for providing electrical power connections and communication connections. A load bearing chassis has one or more generally rectangular apertures and a top portion having a vertically recessed lip portion circumscribing inwardly facing peripheral edges of each aperture. One or more receptacle modules are constructed to fit within the apertures, where each of the receptacle modules provides a plurality of electrical power or communication connectors. Two or more upstanding support members depend from the top portion where the support members rest upon a bottom portion of the structural slab. The support members have flanges horizontally projecting toward a central portion of the aperture, the flanges being disposed below the recessed lip portion for supporting a bottom portion of the receptacle module. A raceway portion is defined between the bottom portion of the receptacle module and the bottom of the structural slab to provide under-floor electrical wiring access to the receptacle module. A load bearing cover plate covers the top portion of the chassis and communicates with the recessed lip portion along its peripheral edges such that the cover plate is flush with the top portion of the chassis and flush with a top surface of the structural slab.

1 Claim, 7 Drawing Sheets

28

28  120

28  122  124

128

128
28

128

128
120  28

128

124  122  28

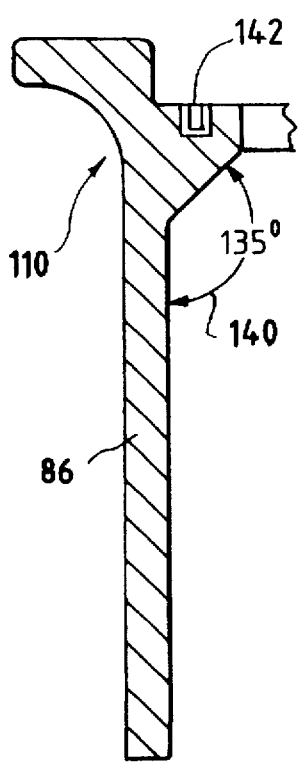
FIG. 6A
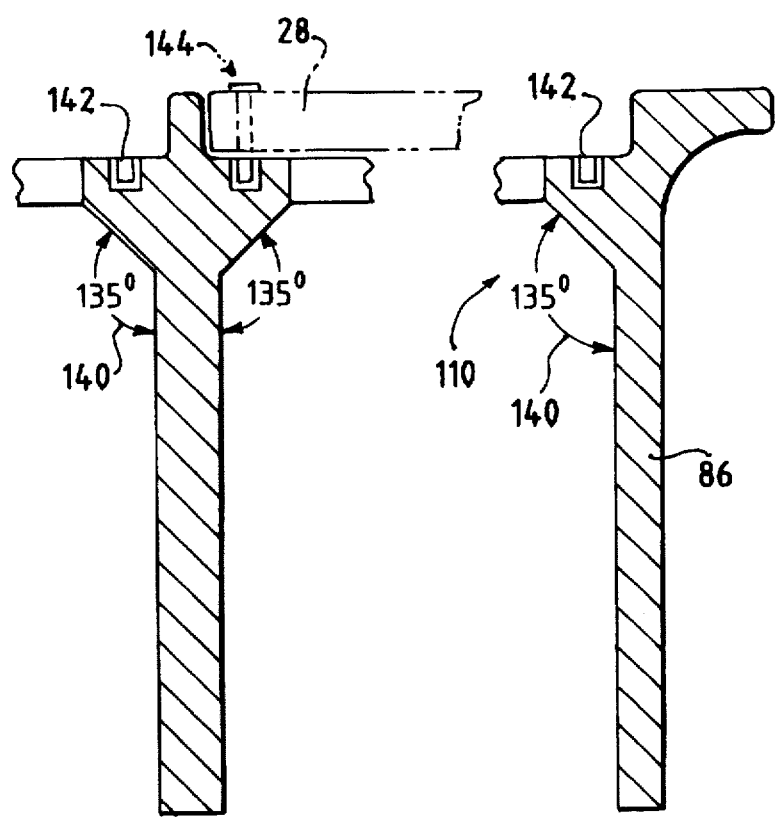
FIG. 6B
FIG. 6C

FLOOR STRUCTURE ELECTRICAL JUNCTION APPARATUS

BACKGROUND OF THE INVENTION

The present invention relates generally to electrical connector devices and more specifically to a floor structure electrical junction box capable of withstanding large weights placed thereon and capable of supplying electrical power and communication connections to user devices.

Factories and other industrial and commercial sites generally supply electrical connectors in the form of receptacles mounted in the wall or suspended from electrical conduit mounted in the ceiling or attached to overhead trusses. Alternatively, conduit and connectors may be permanently mounted in the concrete floor to supply power to equipment which is fixed in place and does not move.

When equipment is moved or changed, electrical requirements may change. Often, time consuming and costly rewiring of the connectors is needed, especially if such connectors are mounted within the concrete floor. Overhead wiring may not be able to adequately supply power to large pieces of equipment and may not meet local electrical code requirements, thus necessitating permanent rewiring of conduit and connectors.

In some industrial and commercial buildings, such as in convention centers, exhibition halls and the like, displays and equipment are frequently moved and replaced. In such situations, aesthetics and visual appeal are important and it is very desirable to hide unsightly electrical power cords and communication cables. Current systems often utilize floor mounted central junction boxes extending upwards from the floor or mounted along a vertical wall that allow multiple power cords to be connected. These boxes often appear as a tangled maze of power cords once multiple pieces of equipment are plugged in.

Typical junction boxes or connector ports either provide limited high-power connections or provide communication connections, such as telephone ports, but not isolated in a single box. Such an arrangement requires exhibitors to use two separate connection systems to meet their power and communication needs and results in the use of long lengths of cables and other conduit. Often, cosmetic devices such as conduit covers and paneling are used to hide such cables.

Exhibition halls and other commercial and industrial sites often utilize heavy equipment within the building. Inside the exhibition halls, trucks, forklifts, cranes and the like may be employed to transport various large pieces of equipment. Such vehicles are extremely heavy and floor mounted junction boxes or panels cannot typically withstand such direct weight. Hence, vehicles are often routed around such floor mounted junction boxes.

A need exists for an electrical junction apparatus and distribution system which provides both high power electrical connections in a variety of voltage and current ratings as well as low voltage communication connections such as telephone and video access. Additionally, such a junction apparatus must be capable of withstanding the weight of heavy transport vehicles traveling over the floor. Such a system must also satisfy the electrical needs of the exhibitor while allowing quick and convenient connection of the user equipment. Furthermore, many such junction boxes must be distributed along the floor of the exhibition hall to service many individual exhibitors.

Accordingly, it is an object of the present invention to substantially overcome the above-described problems.

It is another object of the present invention to provide an electrical junction apparatus mounted below the floor that can withstand the weight of cranes, trucks and other extremely heavy vehicles and the like placed thereupon.

It is a further object of the present invention to provide an electrical junction apparatus which supplies a variety of high power electrical receptacles and communication connectors.

It is also an object of the present invention to provide an electrical junction apparatus having a cover plate which allows power cords to be routed therethrough.

It is still an object of the present invention to provide a versatile electrical junction apparatus which supplies audio, video and telephone connections in addition to various high-power receptacles.

It is yet another object of the present invention to provide an electrical junction apparatus capable of withstanding an average loading of 3,500 pounds per square inch distributed over each ten square inch area.

It is a further object of the present invention to provide an under-floor trough system for routing of cables which can be configured to meet any user layout requirements.

SUMMARY OF THE INVENTION

The disadvantages of known electrical junction apparatus are substantially overcome with the present invention by providing a novel floor structure electrical junction apparatus. The present invention can withstand great loads placed upon it by vehicles, such as cranes and lift equipment, without buckling while simultaneously providing a relatively flat surface that is flush with the floor so that vehicles can easily travel over the cover plate of the device. Electrical devices and communication devices may be plugged into the apparatus while the cover plate covers the top portion of the apparatus such that the corded portion of the plugged user device extends from within the junction box.

This provides a centralized and convenient apparatus to which all suitable user equipment connects. Use of such an apparatus allows the user's to avoid long lengths of extension cords which are unsightly and often become tangled. The apparatus allows the user display booth or display area to maintain a clean, neat and orderly appearance, thus enhancing the exhibit. Additionally, the cover plate which is flush with the floor can withstand the weight of heavy vehicles.

In addition to supplying the user with all possible power requirements in a variety of current ratings and corresponding standard plug configurations, the apparatus provides communication connections such as connection to computer equipment and networks, facsimile devices, telephones and the like. Thus, the user can quickly and conveniently set-up and wire various pieces of equipment by connecting power and signal wiring to a central under-floor junction box.

More specifically, the floor structure electrical junction apparatus of the present invention is mounted within a structural slab, such as a concrete slab, to provide electrical power connections and communication connections to a user. The apparatus includes a load bearing chassis having one or more generally rectangular apertures and a top portion having a vertically recessed lip portion circumscribing inwardly facing peripheral edges of each aperture. One or more receptacle modules are constructed to fit within the apertures, where each of the receptacle modules provides a plurality of electrical power connectors and/or a plurality of communication connectors.

The device includes two or more upstanding support members depending from the top portion where the support members rest upon a bottom portion of the structural slab. The support members have flanges horizontally projecting toward a central portion of the aperture and the flanges are disposed below the recessed lip portion for supporting a bottom portion of the receptacle module such that a raceway portion is defined between the bottom portion of the receptacle module and the bottom of the structural slab to provide under-floor electrical wiring access to the receptacle module.

A load bearing cover plate is configured to cover the top portion of the chassis and communicate with the recessed lip portion along its peripheral edges such that the cover plate is flush with the top portion of the chassis and flush with a top surface of the structural slab, which defines the floor. The apparatus and the cover plate are constructed to bear the load of vehicles contacting the cover plate, such as a load of about 3,500 pounds per square inch distributed over each ten square inches of the cover plate.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIGS. 6A-6C are enlarged side elevational views of a specific embodiment of a floor structure electrical junction apparatus according to the present invention particularly showing support members taken along lines I—I, F—F and H—H respectively, of FIG. 1C.

DETAILED DESCRIPTION OF THE INVENTION

Figure 1A:
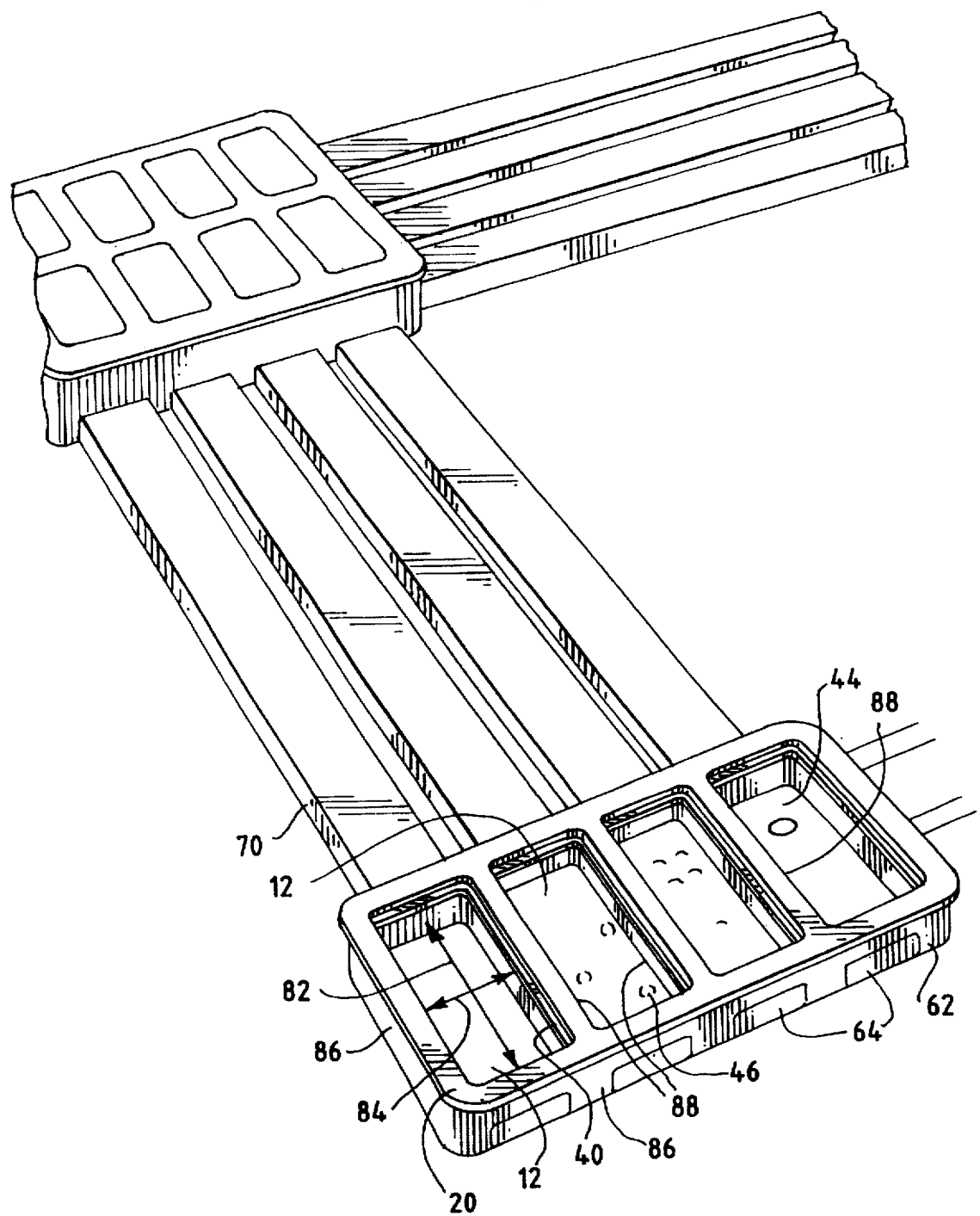
FIG. 1A is a perspective view of a specific embodiment of a floor structure electrical junction apparatus according to the present invention.
Figure 1B:
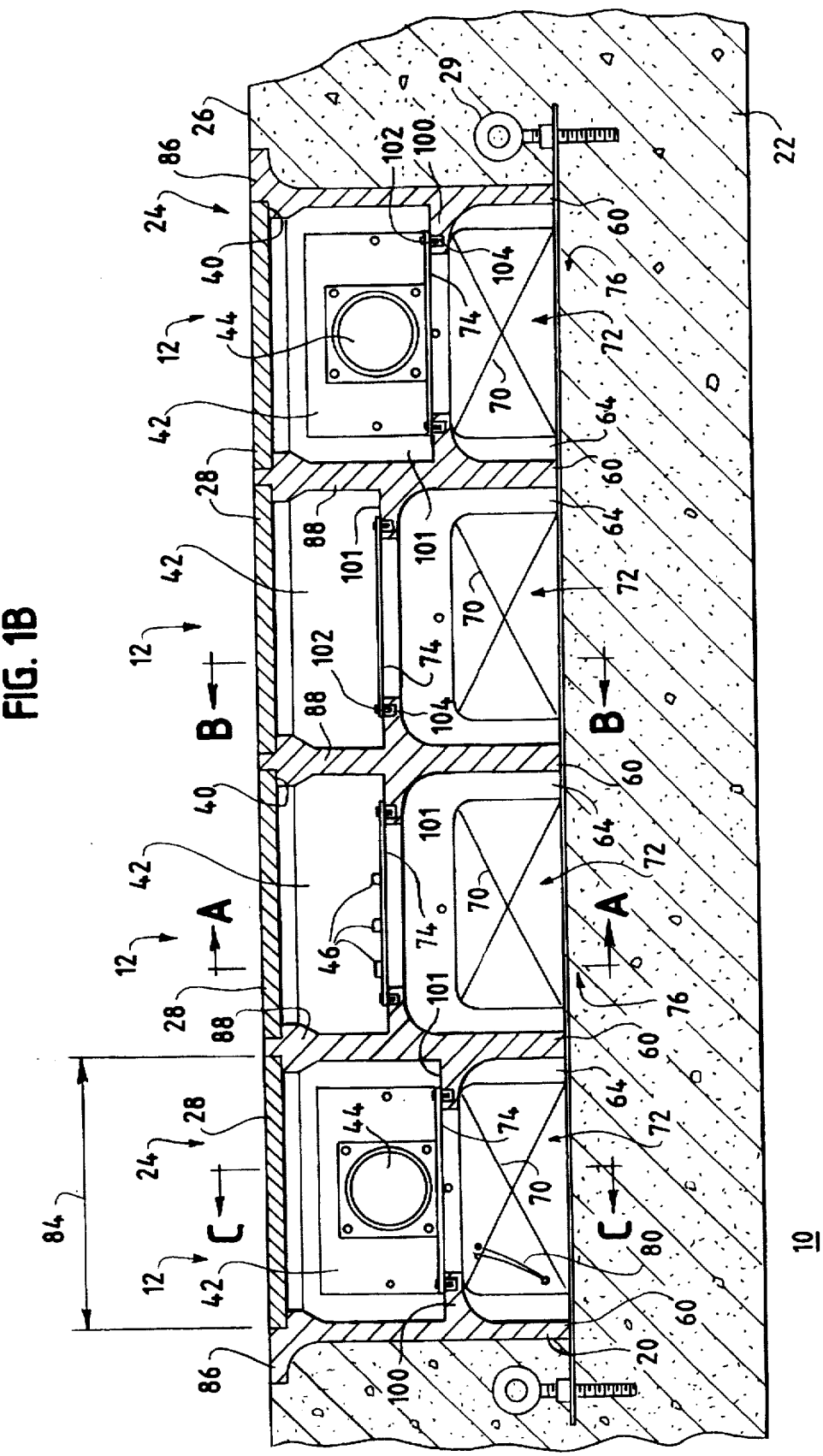
FIG. 1B is a side elevational view of a specific embodiment of the floor structure electrical junction apparatus shown in FIG. 1A.
Figure 1C:
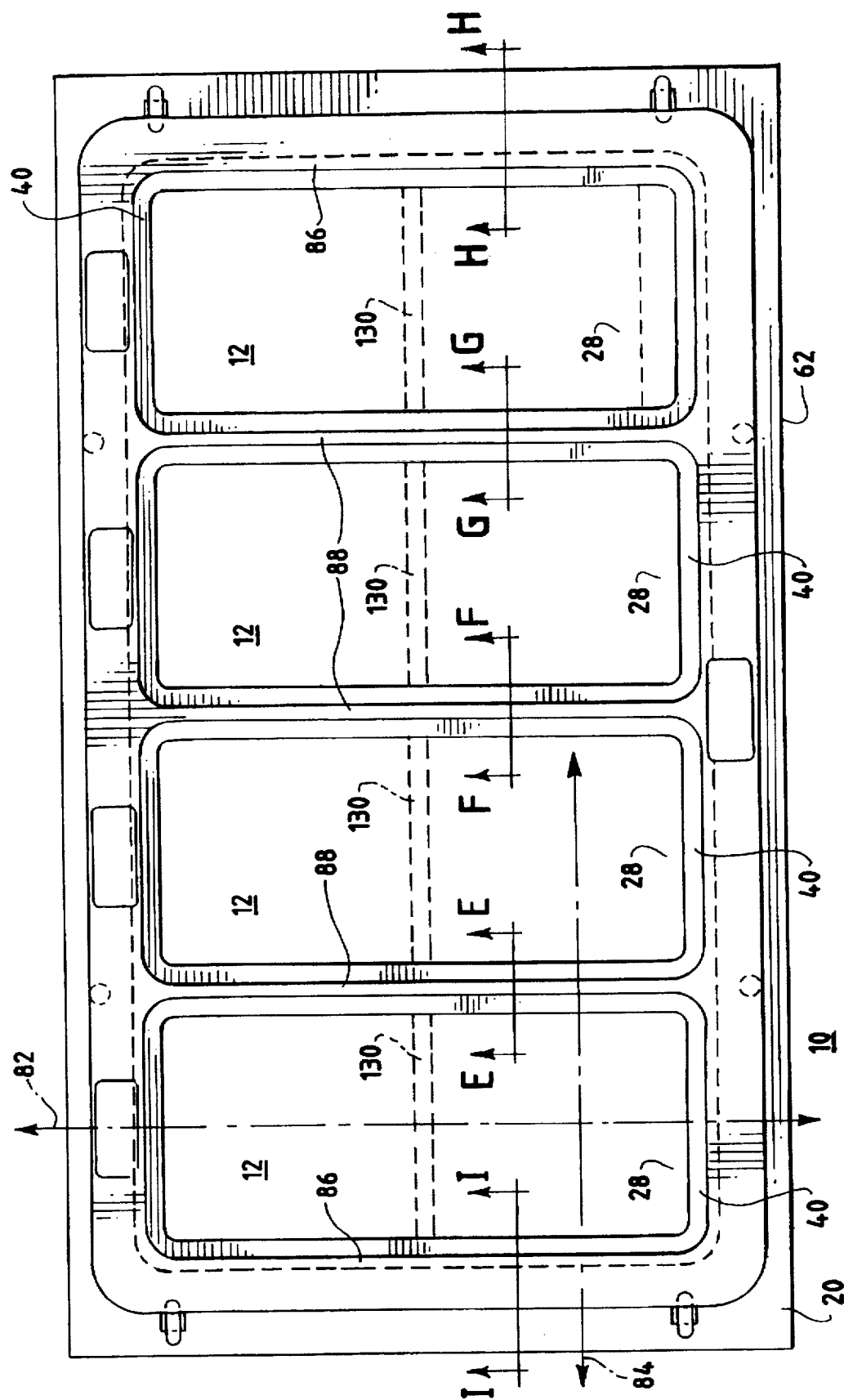
FIG. 1C is a top plan view of a specific embodiment of the floor structure electrical junction apparatus shown in FIG. 1A.

Referring now to FIGS. 1A-1C, a floor structure electrical junction apparatus 10 is illustrated generally. In the illustrated embodiment, four individual generally rectangular junction apertures 12 are shown within a chassis 20. However, the chassis 20 may be constructed to provide any suitable number of junction apertures 12. The chassis 20 is constructed to bear considerable load and is made from heavy cast metal. The chassis 20 is configured to be recessed into a concrete structural slab 22 so that a top portion 24 of the chassis is essentially flush with floor 26. The top portion 24 of the chassis 20 is covered by a heavy gauge metal cover plate 28 as will be described hereinafter.

The chassis 20 may be set into an excavated portion of an existing concrete floor and filled with concrete such that the chassis is surrounded with concrete and the top portion 24 and the cover plate 28 are flush with the level of the floor 26. Eye bolts 29 placed at each corner of the bottom of the chassis 20 allow the chassis to be easily lifted into place with light-duty equipment and secured to the concrete slab 22. Preferably, the chassis 20 is placed in position before the concrete floor is poured such that after the floor is poured, the top portion 24 and the cover plate 28 are flush with the floor. Eye bolts 29 serve to level the chassis relative to the bottom of the concrete slab 22 by adjusting the length of the bolt extending below the chassis 20.

The top portion 24 has a vertically recessed lip portion 40 circumscribing inwardly facing peripheral edges of each aperture 12. The thickness of the cover plate 28 is about equal to the depth of the recessed lip 40 so that when the cover plate is placed on top of the chassis 20, the cover plate is essentially flush with the top portion 24 of the chassis and flush with the floor 26. This allows vehicles traveling along the floor 26 to freely roll over the cover plate 28 and chassis 20 without obstruction. The cover plate 28 is configured to communicate with the recessed lip 40 along the peripheral edges of the cover plate such that the cover plate is flush with the top portion of the chassis and flush with a top surface of the floor 26.

A generally rectangular receptacle module 42 is constructed to fit within each of the four apertures 12. The receptacle module 42 is preferably a flat sheet of metal and may be constructed from aluminum, steel or any suitable material. Alternatively, the receptacle module 42 may be "L-shaped", "U-shaped" or box-like in shape to provide user connections on one or more walls or base of the receptacle module.

The receptacle module 42 is recessed into the chassis below the level of the cover plate 28 so that it is completely enclosed within the chassis 20 when the cover plate is placed above. Upon removing the cover plate 28, the user has access to a plurality of electrical power connectors 44 or communication connectors 46 affixed within the receptacle module 42. Since the receptacle module 42 is recessed below the level of the lip 40 and the cover plate 28 is supported by the lip, the receptacle module does not bear any weight when a load is applied to the chassis 20.

The entire weight of vehicles contacting the chassis 20 or the cover plate 28 is supported by the chassis and cover plate and no load is transferred to the receptacle module. The chassis 20 and the cover plate 28 are constructed from heavy gauge metal and are able to support a load of about 3500 pounds per square inch distributed over each ten square inch area of the cover plate.

Figure 2A:
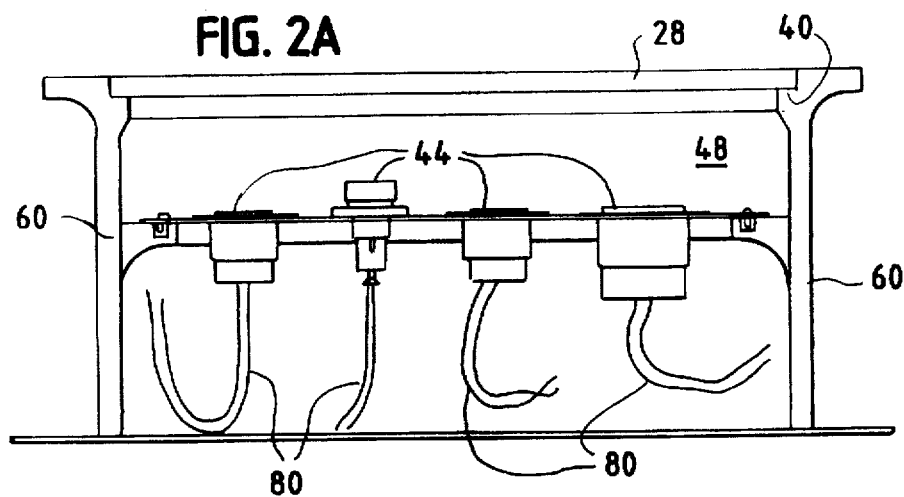
FIG. 2A is a side elevational view of a specific embodiment of a floor structure electrical junction apparatus according to the present invention taken along line A—A of FIG. 1B particularly showing electrical power connectors.
Figure 2B:
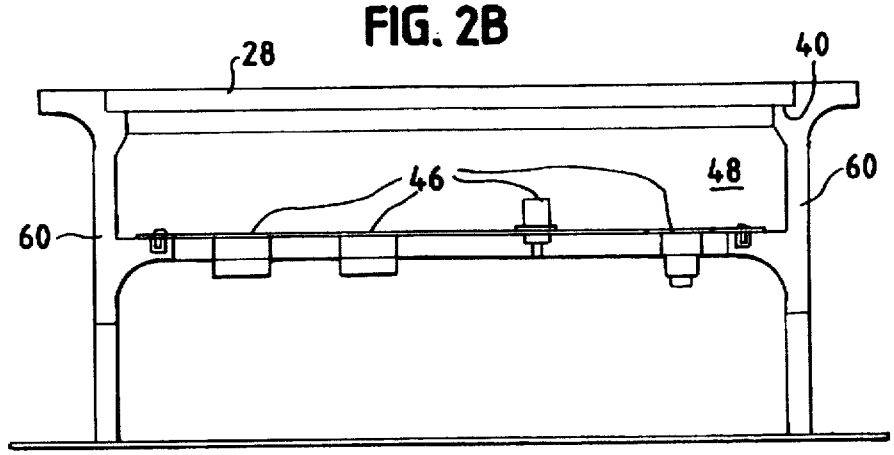
FIG. 2B is a side elevational view of a specific embodiment of a floor structure electrical junction apparatus according to the present invention taken along line B—B of FIG. 1B.
Figure 2C:
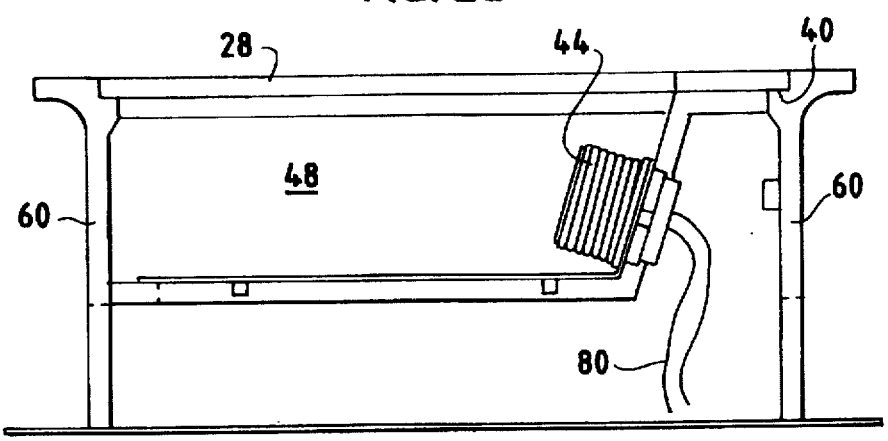
FIG. 2C is a side elevational view of a specific embodiment of a floor structure electrical junction apparatus according to the present invention taken along line C—C of FIG. 1B.
Figure 3A:
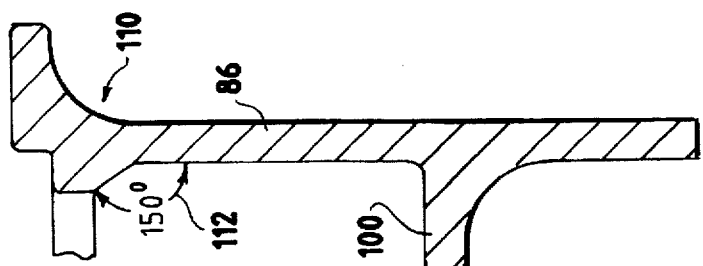
FIGS. 3A-3E are enlarged side elevational views of a specific embodiment of a floor structure electrical junction apparatus according to the present invention particularly showing support members taken along lines H—H, I—I, E—E, G—G and F—F respectively, of FIG. 1C.
Figure 3D:
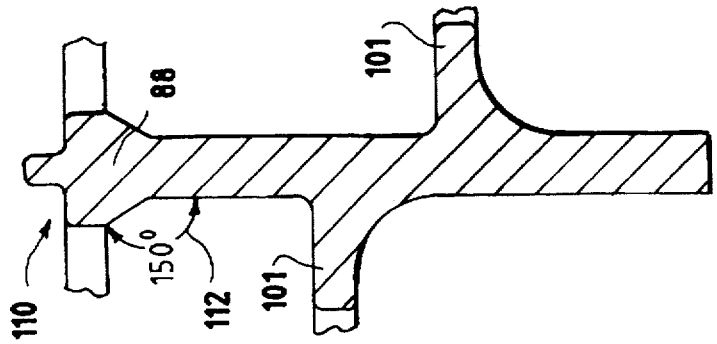
Figure 3E:
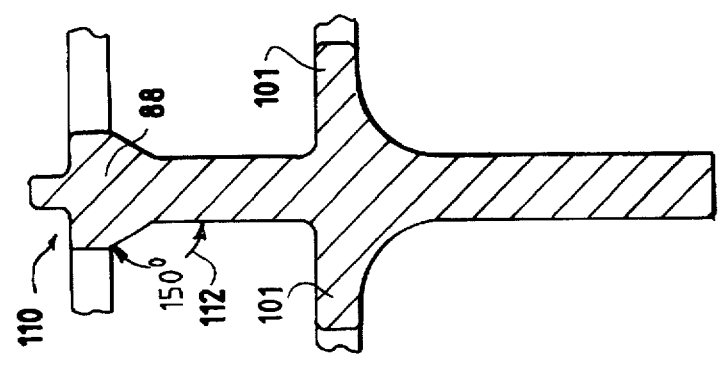
Figure 4:
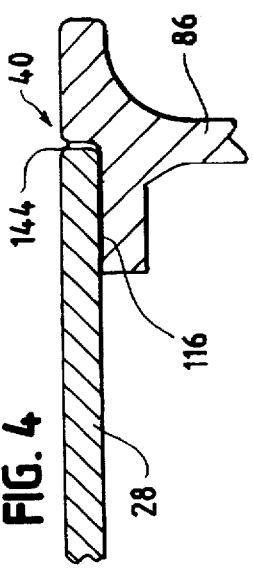
FIG. 4 is an enlarged side view of the support structure show in FIG. 3A particularly showing a lip and cover plate.
Figure 3C:
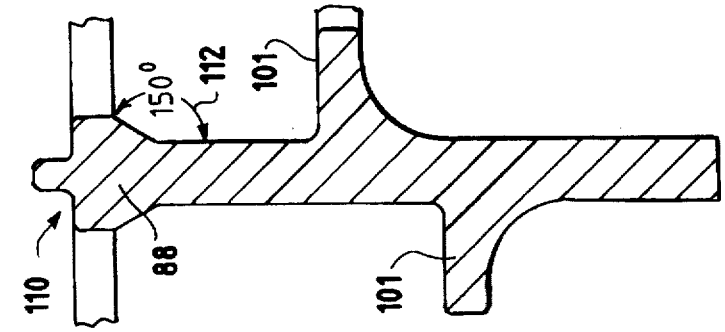
Figure 3B:
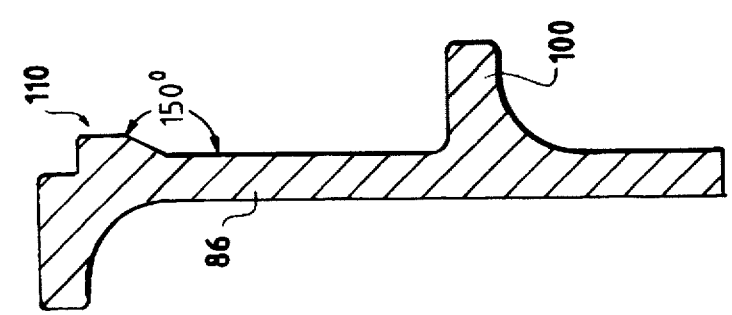

Referring now to FIGS. 2A-2C, each receptacle module 42 provides at least one of a plurality of electrical power connectors 44 and communication connectors 46 within an interior portion of each receptacle module. The interior portion defines a user access space 48 where user plugs may be attached to the electrical power connectors 44 and communication connectors 46. The electrical power connectors 44 and communication connectors 46 may both be provided in the user access space 48 of each receptacle module 42 or may reside in separate receptacle modules, depending upon user requirements. The plurality of electrical power connectors 44 supply electrical power suitable for most user applications. For example, electrical power connectors 44 are provided at ratings of about 120 volts single phase at 15 amperes, 208 volts three phase at 60 amperes, 208 volts three phase at 30 amperes and 480 volts three phase at 100 amperes. However, any standard or custom electrical power connector 44 whose dimensions allow installation within the receptacle module 42 may be used.

The receptacle module 42 may provide electrical power connectors 44 and/or communication connectors 46 in any combination, thus both types of connectors may be provided in a single receptacle module. For example, communication connectors 46 may be provided to supply communication wiring for telephones, facsimile devices, computing devices and fiber optic devices. However, any low-voltage device may be interconnected through use of the various communication connectors 46.

Referring now to FIGS. 1A–1C, two or more upstanding support members 60 depend from the top portion 24 of the chassis 20. Preferably, four support members 60 circumscribe the outside perimeter of the group of four rectangular apertures 12 with additional support members disposed between adjacent rectangular apertures for a total of seven support members. The support members 60 rest upon the structural slab 22 and provide strength and support for the chassis 20. The support members 60 may be in the form of side walls which essentially form a skirt 62 around the chassis and form partitions between adjacent rectangular apertures 12.

The bottom of such a skirt 62 is not, however, totally flush against the structural slab 22. Rather, multiple rectangular openings or raceway entrances 64 are provided to allow rectangular conduit 70 to be connected between multiple chassis 20. However, any shaped conduit, such as circular conduit, may be used if correspondingly shaped raceway entrances 64 are provided. The rectangular conduit 70 may be constructed from aluminum, steel or any suitable material intended to be buried under the floor and must be capable of withstanding the weight of concrete or other foundation material poured on top thereof.

A raceway portion 72 of the chassis 20 is defined between a bottom portion 74 of the receptacle module 42 and a bottom portion 76 of the structural slab 22. The raceway portion 72 provides under-floor electrical wiring access to the receptacle module 42 where electrical wiring or communication wiring 80 is routed through the rectangular conduit 70 and attaches to the respective electrical power connectors 44 and communication connectors 46. Thus, multiple chassis 20 may be connected by central wiring 80 to provide user electrical power and communication signals to a plurality of user locations. The rectangular conduit 70 may be a continuous length of conduit which enters the chassis 20 through the raceway entrances 64 and extends through the raceway portion 72 of the chassis. Alternatively, the rectangular conduit 70 may be constructed in segmented lengths which only extend to the raceway entrance 64 of each chassis. If the conduit 70 is continuous in length, its upper surface must include holes or cut-away portions to allow the wiring 80 to extend to the receptacle modules 42.

Preferably, multiple chassis 20 are interconnected by lengths of conduit 70 in any right angle orientation so that the conduit enters the chassis from any of the four sides. To allow such a flexible arrangement, a pair of oppositely disposed raceway entrances 64 are provided along a longitudinal axis defined by the length 82 of the rectangular aperture while two adjacent pairs of oppositely disposed raceway entrances 64 are provided along an axis defined by the width 84 of the rectangular aperture. All wiring and connectors meet Underwriters Laboratories, Inc. specifications.

Referring now to FIG. 1A–1C and 3A–3E, FIGS. 3A–3E illustrate the support member 60 or sidewall configuration. Each of the four rectangular apertures 12 into which each receptacle module 42 is placed includes an outside support member or sidewall 86 disposed at an outside face of the chassis 20. The outside sidewalls 86 are not disposed between adjacent apertures 12 and are best shown as right and left outside sidewalls in FIGS. 3A and 3B, respectively. The outside sidewalls 86 each have horizontally projecting flanges 100. The outside sidewalls 86 have only a single projecting flange 100 since these flanges need only support one side of the receptacle module 42. Note that all flanges 100 are integrally formed from the sidewall 86 from which they project.

The inside support members or sidewalls 88 are common to adjacent rectangular apertures 12 and provide support for both adjacent apertures by forming partition-like structures therebetween. The inside sidewalls 88 have flanges 101 projecting horizontally towards a central portion of the aperture 12 and project from both sides of the sidewalls 88 to provide partial support for the receptacle module 42 placed thereupon. The flanges 101 shown in FIGS. 3C and 3D have oppositely projecting flanges displaced in height from each other while the flanges 101 shown in FIG. 3E have oppositely projecting flanges disposed at equal height relative to each other. This allows the flanges 101 to support the receptacle modules 42 disposed in the inner two rectangular apertures 12 at a height greater than the height of the receptacle modules disposed in the outer two rectangular apertures. This allows greater flexibility in providing electrical power connectors 44 and communication connectors 46 since each connector type may vary in size. Typically, the electrical power connectors having the highest power ratings have the greatest overall size.

The flanges 100 and 101 support each receptacle module 42 by supporting the bottom portion 74 of each receptacle module. A metal insert 102 fastened through an aperture in the bottom portion 74 projects into a receiving aperture 104 drilled or cast into the flanges 100 and 101. However, any suitable fasteners, such as bolts, screws, rivets and the like may be used to affix the receptacle modules 42 to the corresponding flanges 100.

The lip 40 which circumscribes each rectangular aperture 12 is integrally formed from a portion of the sidewalls 86 and 88 which projects upwardly to form the top portion 24 of the chassis 20. The lip 40 supports the weight of vehicles contacting the cover plate 28, thus the structure 110 from which the lip is formed is thicker toward the top portion 24 of the chassis 20 for increased structural integrity. As shown in the illustrated example, the thicker portion 110 tapers at an angle of about 150 degrees, shown as reference numeral 112, so that the thinner portion forms the sidewalls 86 and 88.

Referring now to FIGS. 3A–3E and 4, FIG. 4 illustrates placement of the cover plate 28 in the lip 40. A small gap 114, for example, a 1/16 inch gap, may exist between the cover plate 28 and the lip 40 to allow the cover plate to be removed at a convenient angle without binding against the lip 40. A suitable gasket, such as a neoprene gasket 116, may be placed over the lower ledge 118 of the lip 40 to provide a cushion and a seal between the cover plate and the chassis 12.

Figure 5A:
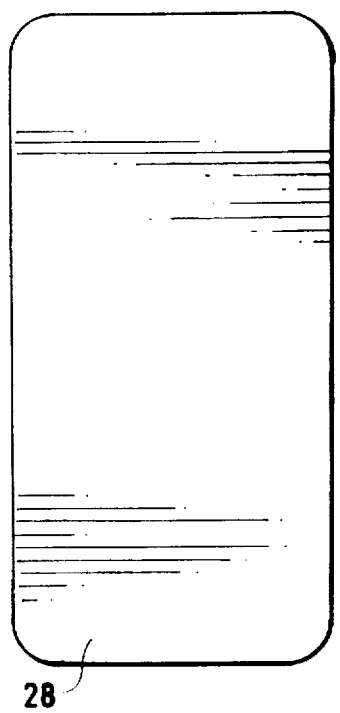
FIGS. 5A-5F are top plan views of a specific embodiment of a floor structure electrical junction apparatus according to the present invention showing access cover plates.
Figure 5B:
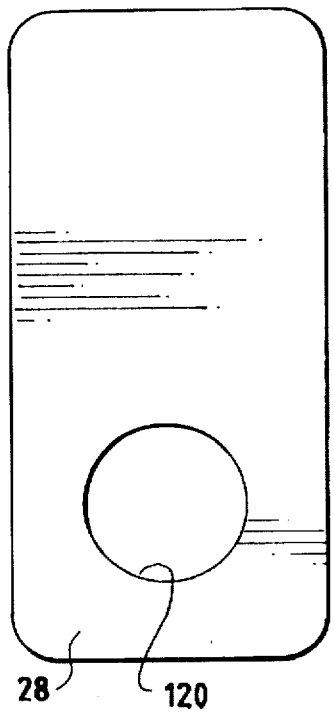

Referring now to FIGS. 1A–1C and 5A–5F, FIGS. 5A–5F illustrate a variety of cover plates 28 that may be used to cover the generally rectangular apertures 12. FIG. 5A illustrates a solid cover plate 28 that fully covers the aperture 12 so that no access to the receptacle module 42 is possible when the cover is affixed to the chassis 20. FIG. 5B illustrates use of a cover plate 28 having a generally circular wire access aperture 120 to permit a user's power plugs to attach to the electrical power connectors 44 or the communication connectors 46 while the cover plate covers the top portion 24 of the chassis 20.

Figure 5C:
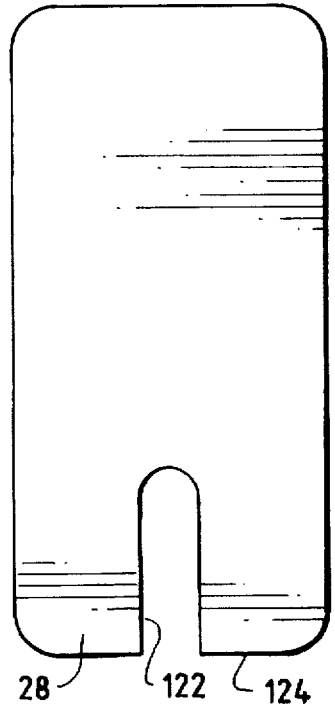

FIG. 5C illustrates a wire access aperture 120 in the form of a slot 122 extending from a peripheral edge 124 of the cover plate 128 towards a central portion of the cover plate to allow power cords attached to the user's power plugs to extend from within the user access space 48 of the receptacle module 42 and through the cover plate while the cover plate covers the top portion 24 of the chassis 20. The wire access aperture 120 permits the user to attach power plugs to the electrical power connectors 44 or the communication connectors 46 while the cover plate 28 covers the top portion 24 of the chassis 28.

Figure 5D:
Figure 5D:
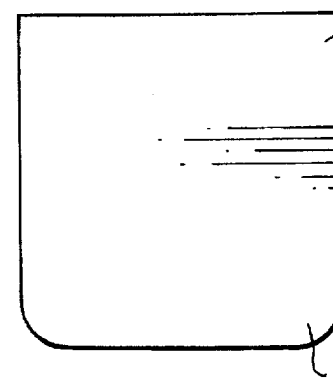
Figure 5E:
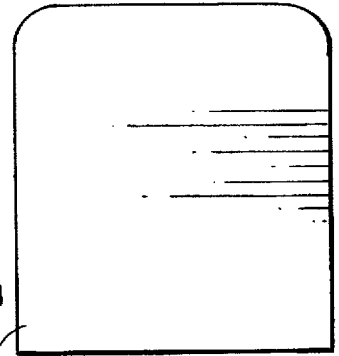
Figure 5E:
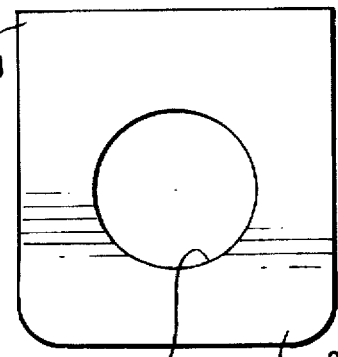
Figure 5F:
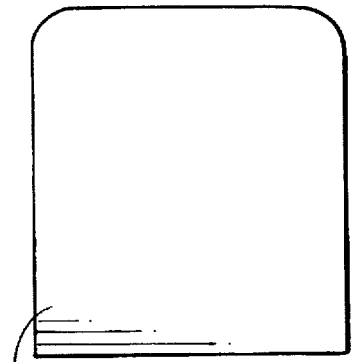
Figure 5F:
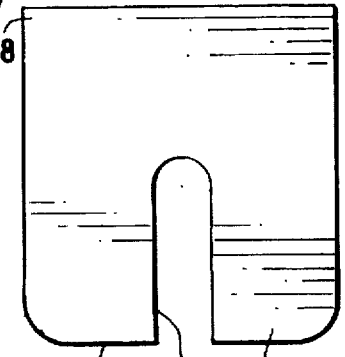

FIGS. 5D–5F illustrate similar cover plates 28 as shown in FIGS. 5A–5C except that the cover plates are formed from two half sections 128 so that the weight of each half section is more conveniently handled by the user. If two half section 128 cover plates 28 are provided, a cross member support bar 130 may be provided across the width 84 of each rectangular aperture 12 at the top portion 24 of the chassis, as best seen in FIG. 1C. The cross member support bar 130 contacts each half section 128 at the boundary where adjacent half sections intersect to help support the half sections 128 when loaded by the weight of vehicles. Alternatively, one of the half sections 128 may have a support lip which overlaps a corresponding flange on the opposite half section. Thus, the common boundary between the half sections 128 provides mutual support and increases the structural integrity of the two half sections.

Referring now to FIG. 1A–1C and 6A–6C, FIGS. 6A–6C illustrate an alternate embodiment showing the outer sidewalls 86 and inner sidewalls 88. As shown in the illustrated embodiment, the thicker portion 110 tapers at an angle of about 135 degrees, shown as reference numeral 140, so that the thinner portion forms the sidewalls 86 and 88. The lip 40 of each sidewall 86 and 88 may include a receiving aperture 142 drilled or cast into the lip so that the cover plate 28 may be fastened thereto by a metal insert or fastener 144. However, any suitable fasteners, such as bolts, screws, rivets and the like may be used to affix the cover plates 28 to the lip 40.

A specific embodiment of a floor structure electrical junction apparatus according to the present invention has been described for the purpose of illustrating the manner in which the invention may be made and used. It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

What is claimed is:

1. An electrical junction apparatus mounted within a structural slab for providing electrical power connections and communication connections to a user, the apparatus comprising:

a load bearing chassis having at least one generally rectangular aperture, a top portion having a vertically recessed lip portion circumscribing inwardly facing peripheral edges of each aperture;

at least one generally rectangular receptacle module constructed to fit within each aperture, each said receptacle module providing at least one of a plurality of electrical power connectors and communication connectors within an interior portion defining a user access space;

at least two upstanding support members depending from the top portion, said support members resting upon a cut-away portion of the structural slab;

the support members having flanges horizontally projecting towards a central portion of each aperture, said flanges disposed below the recessed lip portion for supporting a bottom portion of each receptacle module;

a raceway portion defined between the bottom portion of each receptacle module and the a bottom of the structural slab to provide under-floor electrical wiring access to the receptacle module; and a load bearing cover plate to cover each aperture configured to communicate with the recessed lip portion along said peripheral edges such that the cover plate is flush with the top portion of the chassis and flush with a top surface of the structural slab;

the load bearing chassis wherein said at least one aperture is four generally rectangular apertures, each aperture configured to receive one of the at least one receptacle module such that the support members between adjacent apertures have the horizontally projecting flanges protecting from opposite sides of the support members to provide support for the receptacle modules dis-posed in adjacent apertures; and the horizontal projecting flanges from said support members disposed between adjacent apertures being vertically displaced relative to each other such that the receptacle modules are alternately displaced in height relative to the raceway portion.

* * * * *